UNITED STATES PATENT OFFICE 2,282,258

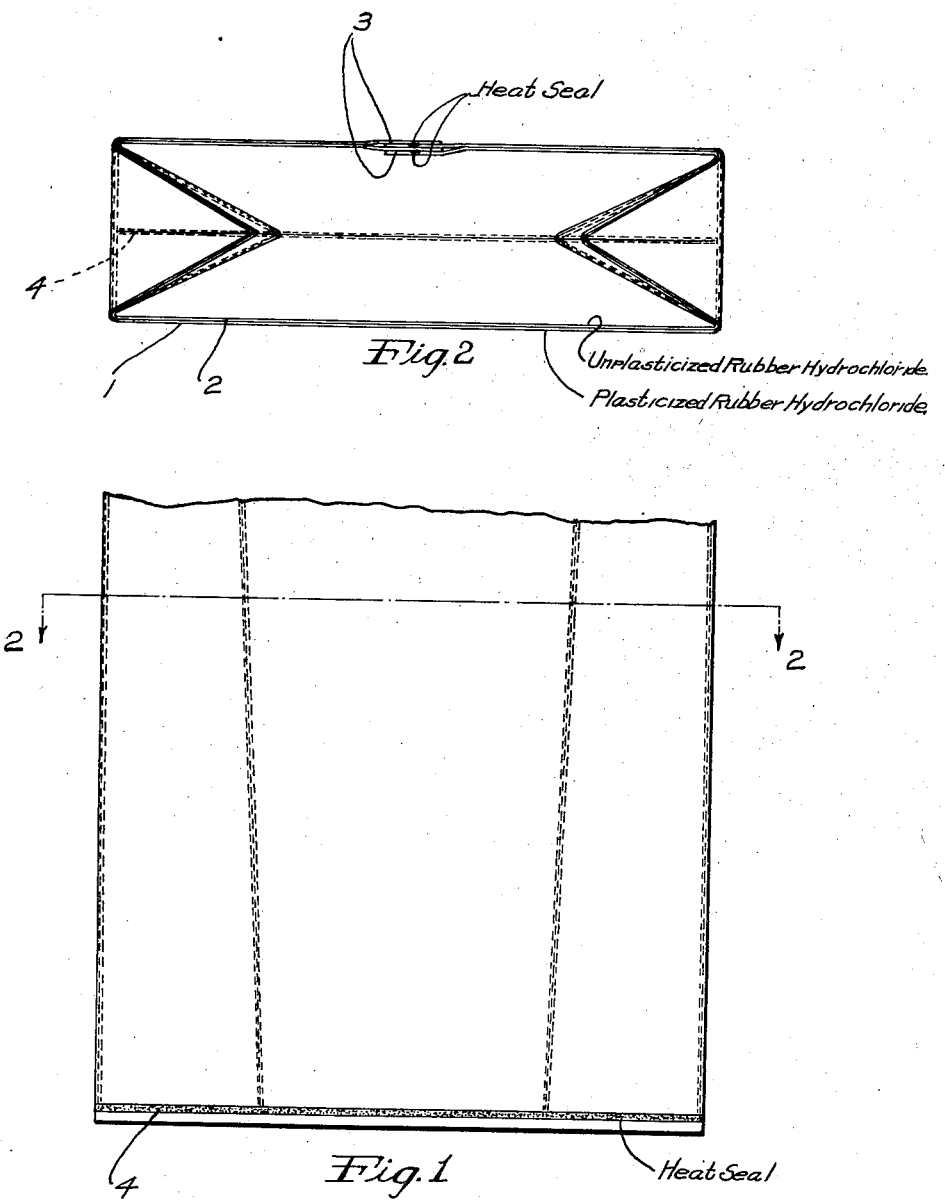

PLASTICIZED AND NONPLASTICIZED DOUBLE WALL BAG

James E. Snyder, Akron, Ohio, assignor to Wingfoot Corporation, Wilmington, Del., a corporation of Delaware Application June 7, 1940, Serial No. 339,336

4 Claims. (Cl. 229—3.5)

This invention relates to a double wall container, the outer wall of which is composed of plasticized rubber hydrochloride and the inner wall of which is composed of unplasticized rubber hydrochloride.

The containers of this invention include all types of double wall bags, including envelopes, pouches, etc. They also include double wall tubes which may be used for packaging meat loaves, cheese bricks, hard candies, etc. The inner and outer walls of the tube are preferably united along the seam, although they may be united at other sections by spot welding or adhesive or any suitable means.

Rubber hydrochloride film has been used for the manufacture of bags etc. for packaging a variety of materials. Such film plasticized with a material such as butyl stearate or butyl phthalate has considerably greater durability than the unplasticized film, and commercial grades so plasticized are on the market and have been used for packaging a variety of materials. However, such film cannot satisfactorily be used for the packaging of many foodstuffs due to its odor or because the plasticizer contaminates the foodstuff. Moreover, the plasticized film does not have the same high resistance to transmission of moisture vapor possessed by the unplasticized film.

According to this invention, the inner wall of the double walled container is made of unplasticized rubber hydrochloride film which is odorless and tasteless, and therefore entirely satisfactory for the packaging of foodstuffs. Moreover, the unplasticized type of rubber hydrochloride is substantially less pervious to moisture vapor and many essential oils, perfumes and flavoring compounds. It does not impart odor or taste to the food or other contents. The outer wall of the container is made of plasticized film to give the bag strength.

The container may be constructed in any usual manner, the perimeter of the inner wall being only slightly smaller than the perimeter of the outer wall on any section. The inner wall should not be substantially smaller than the outer wall. The outer wall thus adds strength to the package and supplies to the inner wall the strength which the unplasticized film lacks.

A specific form of the invention which has wide application as a durable container of lasting moistureproofness with freedom from odor and taste and desirable for packaging hard candies, pop corn, nut meats, pickles and other foodstuffs is a double wall, plicated side, square bottom bag. This is illustrated in the drawing in which Fig. 1 shows a side view of a partially opened bag, and Fig. 2 is a section on the line 2—2 of Fig. 1.

The drawing shows an outer wall, 1, of plasticized rubber hydrochloride film and an inner wall, 2, of unplasticized rubber hydrochloride film. The long seams 3 and bottom seam 4 are both formed by applying heat and pressure to overlapping portions of the film, and the outer wall is united to the inner wall at 4 by the application of heat and pressure. Any type of bag construction with any suitable means for uniting the outer wall to the inner wall may be employed.

I claim:

1. A double wall container, both walls being composed essentially of rubber hydrochloride, the outer wall being plasticized to increase its strength and the inner wall being unplasticized.

2. A double wall bag formed of two pieces of rubber hydrochloride film, the bottom of the inner bag being formed by coalescence of the contacting portions of the bottom of the inner wall, the composition of the films forming the inner and outer walls being distinguished by the fact that the outer wall contains plasticizer which strengthens the film.

3. A double wall, plicated side, square bottom bag with the inner and outer walls each formed of a single sheet of rubber hydrochloride, the long seams of each wall being formed by coalescence of the rubber hydrochloride, the bottom being formed by coalescence of the rubber hydrochloride on opposite sides thereof, the outer wall being united to the inner wall by coalescence of the rubber hydrochloride in the two walls at the bottom thereof, the composition of the two walls being differentiated by the presence of plasticizer in the outer wall and the absence of plasticizer in the inner wall.

4. A food package which comprises an outer bag of rubber hydrochloride film which contains plasticizer which strengthens the film and between this outer film and the foodstuff in the bag a protective barrier of unplasticized rubber hydrochloride.

JAMES E. SNYDER.